(12) United States Patent
Drumm

(10) Patent No.: US 9,086,762 B2
(45) Date of Patent: Jul. 21, 2015

(54) OPTICAL CONTROL SYSTEM WITH MODULATED EMITTERS

(71) Applicant: Rapt IP Limited, Gibraltar (GI)

(72) Inventor: Owen Drumm, Dublin (IE)

(73) Assignee: Rapt IP Limited, Gibraltar (GI)

( * ) Notice: Subject to any disclaimer, the term of this patent is extended or adjusted under 35 U.S.C. 154(b) by 0 days.

(21) Appl. No.: 14/184,572

(22) Filed: Feb. 19, 2014

(65) Prior Publication Data

US 2014/0168169 A1      Jun. 19, 2014

Related U.S. Application Data

(63) Continuation of application No. 13/890,153, filed on May 8, 2013, now Pat. No. 8,952,316, which is a continuation of application No. 13/524,823, filed on Jun. 15, 2012, now Pat. No. 8,461,512, which is a continuation of application No. 13/059,772, filed as application No. PCT/EP2009/005739 on Aug. 7, 2009, now Pat. No. 8,227,742.

(30) Foreign Application Priority Data

Aug. 7, 2008   (IE) .................................. S2008/0651

(51) Int. Cl.
  *G06F 3/042*    (2006.01)
(52) U.S. Cl.
  CPC ...... *G06F 3/0421* (2013.01); *G06F 2203/04109* (2013.01)
(58) Field of Classification Search
  CPC ..... G06F 3/0304; G06F 3/03547; G06F 3/042; G06F 3/0421; G06F 3/0416; G06F 3/0428; H04B 10/11
  USPC ............... 250/221, 216, 206.1; 345/156, 173, 345/175, 176; 341/31; 178/18.03, 18.09
  See application file for complete search history.

(56) References Cited

U.S. PATENT DOCUMENTS

| 3,673,327 A | 6/1972 | Johnson et al. |
| 4,205,304 A | 5/1980 | Moore |

(Continued)

FOREIGN PATENT DOCUMENTS

| CN | 1424696 A | 6/2003 |
| CN | 1433557 | 7/2003 |

(Continued)

OTHER PUBLICATIONS

Japanese Office Action, Japanese Application No. 2011-521486, Feb. 10, 2014, 4 pages.

(Continued)

*Primary Examiner* — Kevin Pyo
(74) *Attorney, Agent, or Firm* — Fenwick & West LLP

(57) ABSTRACT

An optical control system is described, which employs a series of optical emitters and detectors arranged about a touch area. The emitters are driven by a series of functions, and the system is operable to correlate the signals received at the detectors with the functions to determine the amount of energy received by the detectors from each of the emitters. This system means that all or many emitters can be modulated simultaneously, so the scanning process is accelerated. Also, the energy estimates arrived at by correlation with the functions are largely unaffected by external interference signals as well by each other. An additional benefit of the present invention is that the correlation processing makes use of many detector samples and tends to yield results which have higher resolution than the sample values themselves, due to the averaging of noise over the sample set.

20 Claims, 7 Drawing Sheets

(56) References Cited

U.S. PATENT DOCUMENTS

| | | |
|---|---|---|
| 4,243,879 A | 1/1981 | Carroll et al. |
| 4,247,767 A | 1/1981 | O'Brien et al. |
| 4,254,333 A | 3/1981 | Bergstrom |
| 4,267,443 A | 5/1981 | Carroll et al. |
| 4,301,447 A | 11/1981 | Funk et al. |
| 4,384,201 A | 5/1983 | Carroll et al. |
| 4,467,193 A | 8/1984 | Carroll |
| 4,645,920 A | 2/1987 | Carroll et al. |
| 4,672,195 A | 6/1987 | Golborne et al. |
| 4,672,364 A | 6/1987 | Lucas et al. |
| 4,684,801 A | 8/1987 | Carroll et al. |
| 4,703,316 A | 10/1987 | Sherbeck |
| 4,713,534 A | 12/1987 | Masters et al. |
| 4,746,770 A | 5/1988 | McAvinney |
| 4,761,637 A | 8/1988 | Lucas et al. |
| 4,794,248 A | 12/1988 | Gray |
| 4,799,044 A | 1/1989 | Masters et al. |
| 4,818,859 A | 4/1989 | Hough |
| 4,847,606 A | 7/1989 | Beiswenger |
| 4,855,590 A | 8/1989 | Bures et al. |
| 4,893,120 A | 1/1990 | Doering et al. |
| 4,899,138 A | 2/1990 | Araki et al. |
| 4,912,316 A | 3/1990 | Yamakawa |
| 4,943,806 A | 7/1990 | Masters et al. |
| 4,963,859 A | 10/1990 | Parks |
| 4,988,983 A | 1/1991 | Wehrer |
| 4,990,901 A | 2/1991 | Beiswenger |
| 5,136,156 A | 8/1992 | Nounen et al. |
| 5,146,081 A | 9/1992 | Heikkinen et al. |
| 5,164,714 A | 11/1992 | Wehrer |
| 5,355,149 A | 10/1994 | Casebolt |
| 5,414,413 A | 5/1995 | Tamaru et al. |
| 5,635,724 A | 6/1997 | Higgins |
| 5,793,361 A | 8/1998 | Kahn et al. |
| 6,429,857 B1 | 8/2002 | Masters et al. |
| 6,556,149 B1 | 4/2003 | Reimer et al. |
| 6,559,935 B1 | 5/2003 | Tew |
| 6,597,348 B1 | 7/2003 | Yamazaki et al. |
| 6,674,895 B2 | 1/2004 | Rafii et al. |
| 6,690,363 B2 | 2/2004 | Newton |
| 6,765,193 B2 | 7/2004 | Sumriddetchkajorn |
| 6,972,753 B1 | 12/2005 | Kimura et al. |
| 7,265,748 B2 | 9/2007 | Ryynanen |
| 7,295,329 B2 | 11/2007 | Gruhlke et al. |
| 7,310,090 B2 | 12/2007 | Ho et al. |
| 7,355,593 B2 | 4/2008 | Hill et al. |
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 8,218,154 B2 | 7/2012 | Østergaard et al. |
| 8,227,742 B2 | 7/2012 | Drumm |
| 8,228,304 B2 | 7/2012 | Morrison et al. |
| 8,461,512 B2 | 6/2013 | Drumm |
| 2002/0050983 A1 | 5/2002 | Liu et al. |
| 2002/0075243 A1* | 6/2002 | Newton ........................ 345/173 |
| 2004/0252091 A1 | 12/2004 | Ma et al. |
| 2004/0263482 A1 | 12/2004 | Goertz |
| 2005/0162398 A1 | 7/2005 | Eliasson et al. |
| 2005/0248540 A1 | 11/2005 | Newton |
| 2006/0114237 A1 | 6/2006 | Crockett et al. |
| 2006/0227120 A1 | 10/2006 | Eikman |
| 2006/0255248 A1 | 11/2006 | Eliasson |
| 2007/0125937 A1 | 6/2007 | Eliasson et al. |
| 2007/0152985 A1 | 7/2007 | Østergaard et al. |
| 2007/0165008 A1 | 7/2007 | Crockett |
| 2007/0201042 A1 | 8/2007 | Eliasson et al. |
| 2008/0007540 A1 | 1/2008 | Østergaard |
| 2008/0007542 A1 | 1/2008 | Eliasson et al. |
| 2008/0088603 A1 | 4/2008 | Eliasson et al. |
| 2008/0189046 A1 | 8/2008 | Eliasson et al. |
| 2009/0122020 A1 | 5/2009 | Eliasson et al. |
| 2009/0273794 A1 | 11/2009 | Østergaard et al. |
| 2010/0193259 A1 | 8/2010 | Wassvik |
| 2011/0074734 A1 | 3/2011 | Wassvik et al. |
| 2011/0074735 A1 | 3/2011 | Wassvik et al. |
| 2011/0090176 A1 | 4/2011 | Christiansson et al. |
| 2011/0102374 A1 | 5/2011 | Wassvik et al. |
| 2011/0227874 A1 | 9/2011 | Fahraeus et al. |

FOREIGN PATENT DOCUMENTS

| | | |
|---|---|---|
| EP | 0304820 A2 | 3/1989 |
| EP | 0572009 A1 | 12/1993 |
| EP | 0601651 A1 | 6/1994 |
| GB | 2133537 A | 7/1984 |
| GB | 2171195 A | 8/1986 |
| JP | 05-094255 A | 4/1993 |
| JP | 7-230352 A | 8/1995 |
| JP | 8-147091 A | 6/1996 |
| JP | 08-307356 A | 11/1996 |
| JP | 11-282628 A | 10/1999 |
| JP | 2000-284899 A | 10/2000 |
| JP | 2003-330603 A | 11/2003 |
| JP | 2004-126929 A | 4/2004 |
| JP | 2006-323521 A | 11/2006 |
| JP | 2007-207281 A | 8/2007 |
| JP | 2008-059123 A | 3/2008 |
| JP | 2008-533581 A | 8/2008 |
| JP | 2011-525651 A | 9/2011 |
| WO | WO 01/40922 A2 | 6/2001 |
| WO | WO 2007/058727 A1 | 5/2007 |
| WO | WO 2008/004103 A2 | 1/2008 |
| WO | WO 2008/032270 A2 | 3/2008 |

OTHER PUBLICATIONS

Cummings, T.F., "Transparent Keyless Keyboard for Variable Terminal Applications," IBM Technical Disclosure Bulletin, Sep. 1977, pp. 1609-1611, vol. 20, No. 4.

Baumann, D.D., "Optical Data Input Device," IBM Technical Disclosure Bulletin, Mar. 1969, pp. 1281-1282, vol. 11, No. 10.

Thompson, D.R., "Finger Position Detect Method," IBM Technical Disclosure Bulletin, Dec. 1980, p. 3289, vol. 23, No. 7B.

Callens, P., "Optical Keyboard Device and Technique," IBM Technical Disclosure Bulletin, Nov. 1983, pp. 2763-2764, vol. 26, No. 6.

"Enhanced Optical Touch Input Panel," IBM Technical Disclosure Bulletin, Sep. 1985, pp. 1760-1762, vol. 28, No. 4.

Chinese Office Action, Chinese Application No. 200980139612.6, Feb. 22, 2013, 22 pages.

Japanese Office Action, Japanese Application No. 2011-521484, Feb. 26, 2013, 6 pages.

PCT International Search Report and Written Opinion, PCT/EP2009/005739, Feb. 5, 2010, 7 Pages.

PCT International Preliminary Report on Patentability, PCT Application No. PCT/EP2009/005739, Feb. 8, 2011, 8 pages.

Chinese Second Office Action, Chinese Application No. 200980139934.0, Oct. 22, 2013, 5 pages.

Chinese Office Action, Chinese Application No. 200980139934.0, Mar. 7, 2013, 13 pages.

United States Office Action, U.S. Appl. No. 13/524,823, Jan. 16, 2013, 7 pages.

United States Office Action, U.S. Appl. No. 13/890,153, May 9, 2014, 5 pages.

\* cited by examiner

|   | Decimal | Binary Emitter 0 ········· Emitter 15 | |
|---|---|---|---|
| 0 | 19418 | → 0100101111011010 | (9 one bits) |
| 1 | 40557 | → 1001111001101101 | (10 one bits) |
| 2 | 11520 | → 0010110100000000 | (4 one bits) |
| 3 | 63671 | → 1111100010110111 | (11 one bits) |
| 4 | 13113 | → 0011001100111001 | (8 one bits) |
| 5 | 59022 | → 1110011010001110 | (9 one bits) |
| 6 | 21987 | → 0101010111100011 | (9 one bits) |
| 7 | 32852 | → 1000000001010100 | (4 one bits) |
| 8 | 52006 | → 1100101100100110 | (8 one bits) |
| 9 | 7825 | → 0001111010010001 | (7 one bits) |
| 10 | 44540 | → 1010110111111100 | (11 one bits) |
| 11 | 30795 | → 0111100001001011 | (8 one bits) |
| 12 | 46021 | → 1011001111000101 | (9 one bits) |
| 13 | 26226 | → 0110011001110010 | (8 one bits) |
| 14 | 54559 | → 1101010100011111 | (10 one bits) |
| 15 | 168 | → 0000000010101000 | (3 one bits) |
| 16 | 46298 | → 1011010011011010 | (9 one bits) |
| 17 | 24941 | → 0110000101101101 | (8 one bits) |
| 18 | 53760 | → 1101001000000000 | (4 one bits) |
| 19 | 1975 | → 0000011110110111 | (9 one bits) |
| 20 | 52281 | → 1100110000111001 | (8 one bits) |
| 21 | 6542 | → 0001100110001110 | (7 one bits) |
| 22 | 43747 | → 1010101011100011 | (9 one bits) |
| 23 | 32596 | → 0111111101010100 | (10 one bits) |
| 24 | 13350 | → 0011010000100110 | (6 one bits) |
| 25 | 57745 | → 1110000110010001 | (7 one bits) |
| 26 | 21244 | → 0101001011111100 | (9 one bits) |
| 27 | 34635 | → 1000011101001011 | (8 one bits) |
| 28 | 19653 | → 0100110011000101 | (7 one bits) |
| 29 | 39282 | → 1001100101110010 | (8 one bits) |
| 30 | 10783 | → 0010101000011111 | (8 one bits) |
| 31 | 65448 | → 1111111110101000 | (11 one bits) |

Fig. 5

OPTICAL CONTROL SYSTEM WITH MODULATED EMITTERS

CROSS REFERENCE TO RELATED APPLICATIONS

This application is a continuation of U.S. application Ser. No. 13/890,153, filed May 8, 2013, which application is a continuation of U.S. application Ser. No. 13/524,823, filed Jun. 15, 2012, now issued as U.S. Pat. No. 8,461,512, which application is a continuation of U.S. application Ser. No. 13/059,772, filed Feb. 18, 2011, now issued as U.S. Pat. No. 8,227,742, which is a national stage entry of PCT/EP2009/005739 filed Aug. 7, 2009, which claims priority to Irish Patent Application S2008/0651 filed on Aug. 7, 2008. The subject matter of all of the foregoing is incorporated herein by reference in their entirety.

BACKGROUND

1. Field of the Invention

This invention relates to optical control systems and devices, for example, touch sensitive displays and touch sensitive overlays for displays.

2. Description of the Related Art

In a traditional optical touch overlay, optical emitters and detectors are arranged along opposing edges of a rectangular touch sensitive area. An orthogonal grid is formed by the optical beams between the emitters and the corresponding detectors over the touch sensitive area. The beams are scanned in sequence to determine if the path loss indicates that there is an object (such as a finger or a stylus) interrupting or modulating any of the beams.

The touch sensitive area may be an optically transparent planar waveguide through which the beams pass by total internal reflection, or a surface over which the beams pass in close proximity to the surface and substantially parallel to the surface.

In the case of a waveguide, the material used can be a transparent sheet of plastic or glass. An object such as a finger or a stylus coming into contact with the transparent waveguide will have a higher refractive index than the air normally surrounding the waveguide. The increase in refractive index will disrupt total internal reflection of light energy at the interface between the waveguide and the touching object, causing increased light leakage from the waveguide over the area of contact. This leakage attenuates any beams passing through the position of the touch event. Correspondingly, the removal of the touching object will cause the attenuation of the passing beams to be reduced as will be detectable at the output of the associated detectors.

In the present specification the term "light" includes IR and UV radiation, and the term "optical" is to be interpreted accordingly.

When the touch sensitive area is a surface over which the beams pass, an object which is not optically transparent at the wavelength in use will attenuate or interrupt the beams passing through the object location.

This is illustrated in FIG. 1, where an opaque object 10 at position T attenuates a beam 12 between an emitter 14 on the left side of a touch sensitive area 16 and a detector 18 on the right side of the touch area 16. The opaque object 10 also interrupts a beam 20 between orthogonal axis emitters 22 and the corresponding detectors 24.

Scanning logic circuitry associated with the emitters and detectors can determine the intersection point of one or more interrupted beam paths and deduce the position of the interrupting object. The object must be large enough to detectably attenuate at least one beam in one axis and at least one beam in the orthogonal axis.

Such a panel traversed by optical paths can, in addition to the detection of touch events, detect the operation of mechanical control devices arranged along the optical paths. For example, a mechanical button control may be inserted along an optical path whereby the button control presents a minimal attenuation to optical energy when the button actuator is in its resting position, but introduces significant optical attenuation when the button actuator is pressed. This may be accomplished by introducing an opaque vane into the optical path when the button is pressed. Various mechanical designs for control devices may be used to modulate the optical energy passing along the optical paths such that the status of such control devices can be detected by processing the signals from the optical detectors.

The use of amplitude modulation of optical emitter outputs in optical touch and related optical control systems is well known. Typically, a specific frequency of modulation is chosen which can readily be separated from unwanted signals at the detector output by narrowband filtering. This modulating signal can be applied to an emitter by using it to modulate the current flowing through the emitter, which is usually be a current controlled device such as an LED.

However, optical emitter and detector response times (often tens of microseconds for detectors) and the need to be distant in frequency from the harmonics of mains-powered light sources limit the range of usable frequencies in low cost applications, so most devices using airborne optical transmission have optical emitters which are amplitude modulated by a fixed frequency in the 30 kHz to 80 kHz range.

Therefore, any device using optical detectors may receive external interference originating from other devices with emitters radiating light of a similar wavelength which is modulated by a similar range of frequencies.

Optical scanning devices normally activate emitters (modulated or unmodulated) in a sequential manner, so that the signal at one or more active detectors can be associated with a known source emitter. This prolongs the scanning process, particularly if modulation needs to be detected for each emitter signal to be determined reliably.

SUMMARY

The invention provides an optical control system comprising:

a plurality of optical emitters and a plurality of optical detectors defining therebetween an area of optical paths whereby the transmission of energy between an emitter and a detector may be modulated by an optical interaction occurring in the vicinity of said area, wherein at least one of said detectors is positioned to receive optical energy from more than one of said optical emitters;

drive circuitry for driving a plurality of said optical emitters simultaneously according to a modulation scheme in which each emitter is modulated with a different modulation function, said functions being orthogonal relative to one another;

correlation means associated with said at least one detector for receiving an output therefrom and correlating said output with at least those modulation functions driving those emitters which said at least one detector is positioned to receive optical energy from, to thereby determine the amount of energy incident on said at least one detector from each of said emitters.

In the present invention, functions which are orthogonal to one another are used to amplitude modulate the emitter devices, with one orthogonal function allocated to each emitter. Preferably, each modulating function has a broad frequency spectrum and a strongly non-periodic nature in the time domain so that it will not correlate well with interference signals, which are typically periodic.

In the present specification the term "orthogonal" refers to any two chosen functions from a family of "orthogonal" functions having zero cross-correlation.

Preferably, each modulating function has just two values over time so that digital control of the emitter may be used for simplification of the associated circuitry and processing. The depth modulation applied to the emitter may be any value from greater than 0% up to 100%.

There exist families of complex functions which are orthogonal to each other. If each emitter in a group of emitters is allocated a function from an orthogonal family of functions, the emitters may be simultaneously modulated by their respective functions but the energy from each emitter arriving at a given detector will still be measurable separately. By correlating the output from a detector which receives the composite energy from at least one emitter with each of the modulation functions in use, the resulting correlation values are accurate estimates of the energy received from the emitter associated with each modulation function.

BRIEF DESCRIPTION OF THE DRAWINGS

The invention will now be further described by way of example only with reference to the accompanying drawings, in which:

FIG. 5 is a table of 16-bit words for use in driving a set of 16 emitters with reduced power requirements;

DETAILED DESCRIPTION

Figure 1:
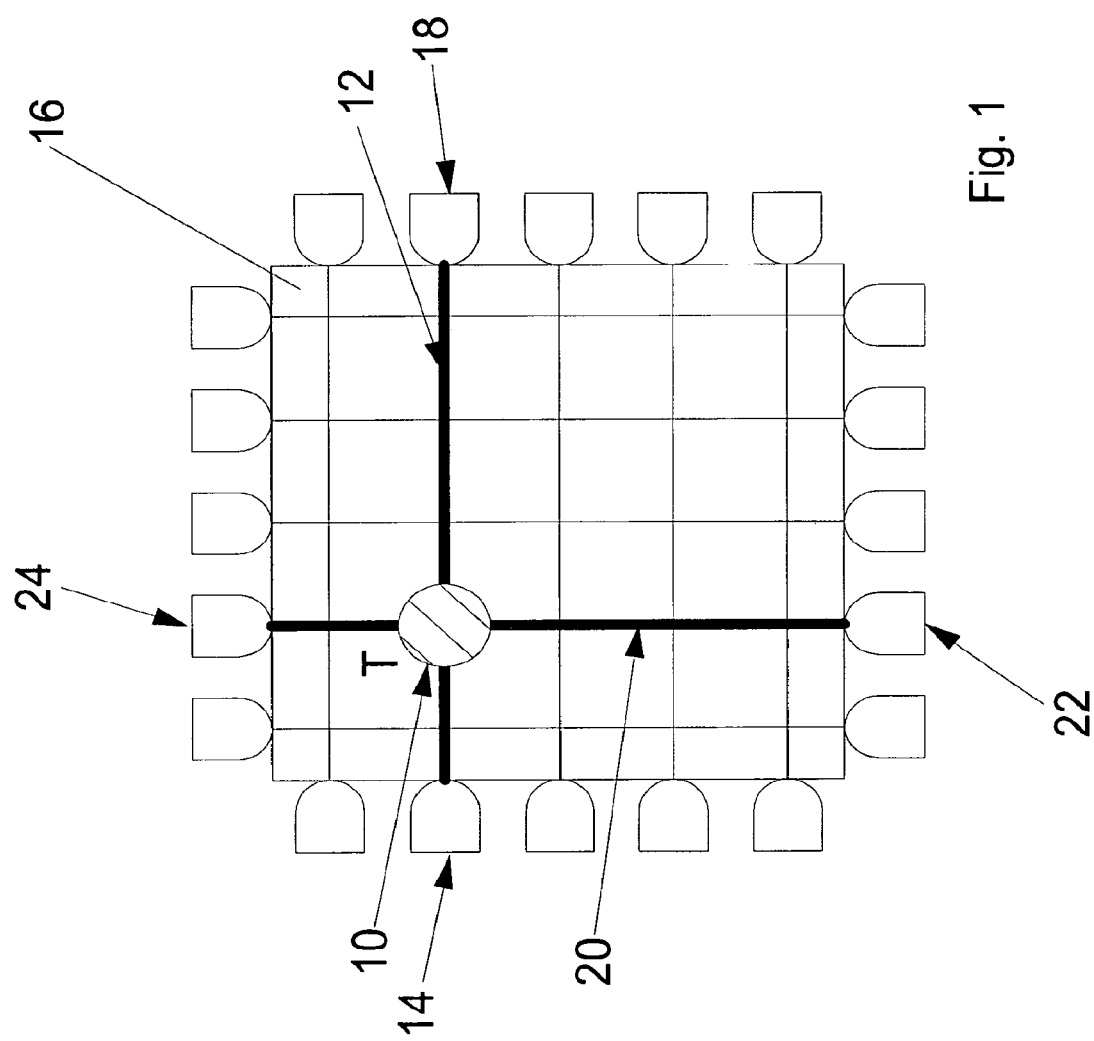
FIG. 1 (previously described) is a schematic illustration of a known optical touch detection system.
Figure 2:
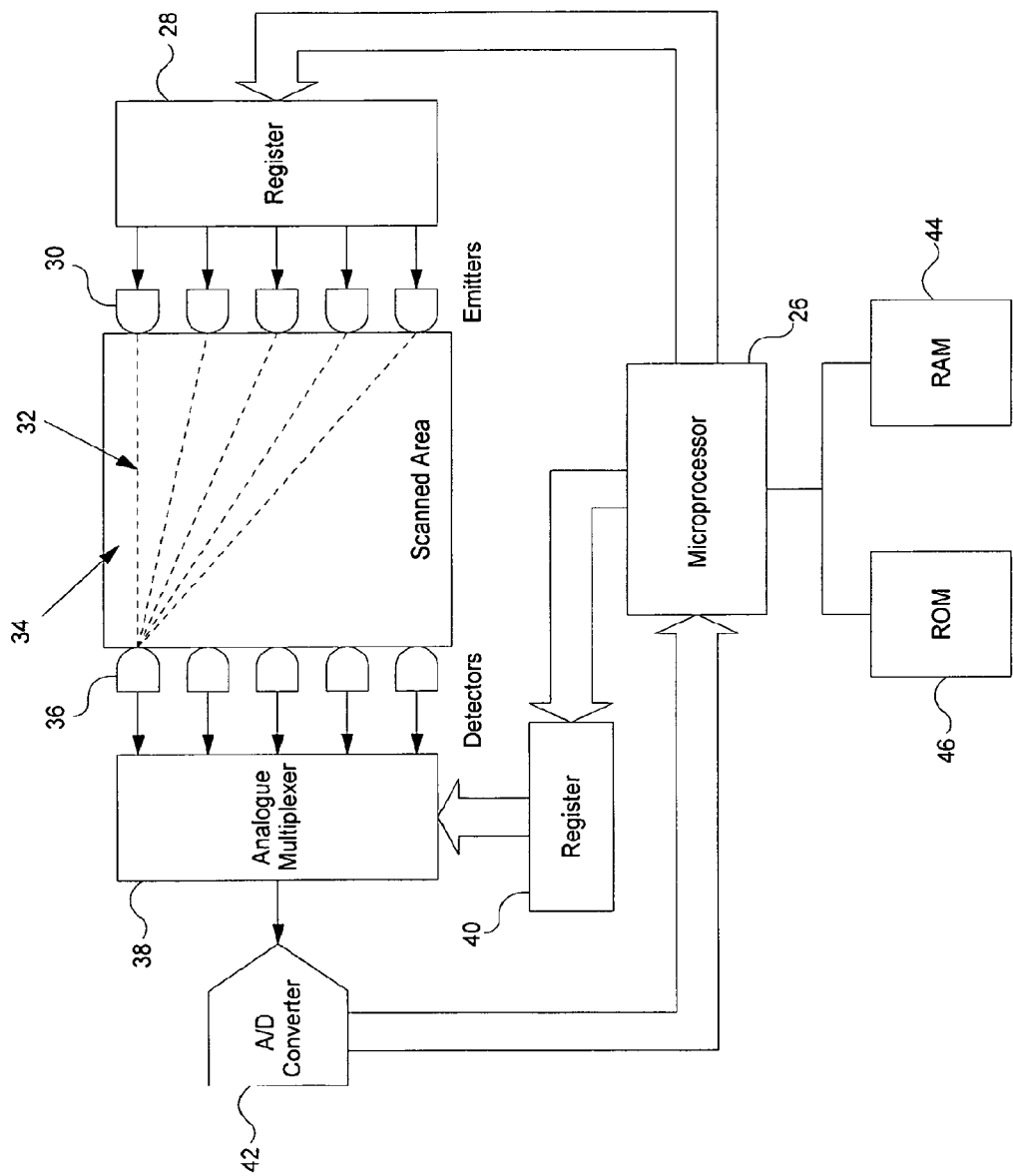
FIG. 2 is a block diagram of an optical control system.

FIG. 2 shows the hardware sections of an optical control system. The microprocessor 26 writes emitter modulation patterns to the emitter register 28 under software control. The sample values for at least one of the emitters 30 are written at the start of every sample interval. The beams 32 travel across the touch sensitive area 34 and, if not interrupted by an opaque object, arrive at a detector 36. The analogue multiplexer 38 selects the analogue output of one detector 36 as directed by the value in register 40 and routes it to the analogue-to-digital converter 42 for conversion into numeric form for processing by the microprocessor 26. The analogue multiplexer 38 may select the outputs of more than one detector during a single sample interval.

The touch sensitive area 34 can be an optically transparent planar waveguide through which the beams pass by total internal reflection, or a surface over which the beams pass in close proximity to the surface and substantially parallel to the surface, to give two examples. The emitters and detectors are shown as two simple arrays on opposite edges, but in practice, emitters and detectors may be arranged around the entire perimeter of the surface (e.g. all four edges of a rectangular surface) to maximise the resolution of, the touch sensitive system.

The current drawn by the emitters 30 when they are radiating will usually be substantial and it is advantageous to minimize the time for which the emitters 30 are active. Therefore, it may be efficient in a device with current limitations for the microprocessor 26 to update the emitter register 28 at the start of every sample period and to control the analogue multiplexer 38 by means of register 40 such that the signals from more than one detector 36 are routed to the analogue-to-digital converter 42 in rapid succession and the resulting sample values written to RAM 44 for processing later. Before the first analogue-to-digital conversion can be performed by the converter 42 in a given sample interval, there may need to be a pause corresponding to at least the response times of the emitters 30 and the detectors 36. When the sample and store process is complete for all of the detectors 36, the sample period can end and the next sample period can commence with the updating of the emitter register 28. At least one digital sample of the output of the detectors 36 is required for every update of the emitter register 28. When there has been a sample interval with an emitter update and sample acquisition for each bit of the modulating functions, the emitters 30 can all be rendered inactive by the controlling software and the sample values in the RAM 44 can be correlated with the modulating functions.

The use or a family of orthogonal modulation functions in the present invention means that all or many emitters can be modulated simultaneously, so the scanning process is accelerated. Also, the energy estimates arrived at by correlation with the modulating functions are largely unaffected by external interference signals as well by each other. An additional benefit of the present invention is that the correlation processing makes use of many detector samples and tends to yield results which have higher resolution than the sample values themselves, due to the averaging of noise over the sample set.

A given family of orthogonal functions will have a minimum period over which the member functions of that family are fully orthogonal. That minimum period will typically be a number of samples which is a power of two. There will be more functions in an orthogonal family when the number of samples is increased (i.e. a longer code length is used), permitting more emitters to be simultaneously active. However, long codes will also incur a longer scanning time for a given modulation rate. Ideally, the shortest code length which provides an orthogonal modulation function for each emitter in a group (where a group might be all of the emitters in a system or might be the emitters relating to an X or Y axis) would be used.

In selecting modulation functions from a family of orthogonal functions, some may be more desirable than others. For example, the families of Walsh functions are families of mainly complex orthogonal functions where each has only two values over time, but some members are purely periodic i.e. they are square waves with a constant period. The non-periodic functions are to be preferred since the functions used preferably have the broad spectrum mentioned above. However, this constraint reduces the number of family members which can be used for a given code length.

Figure 3:
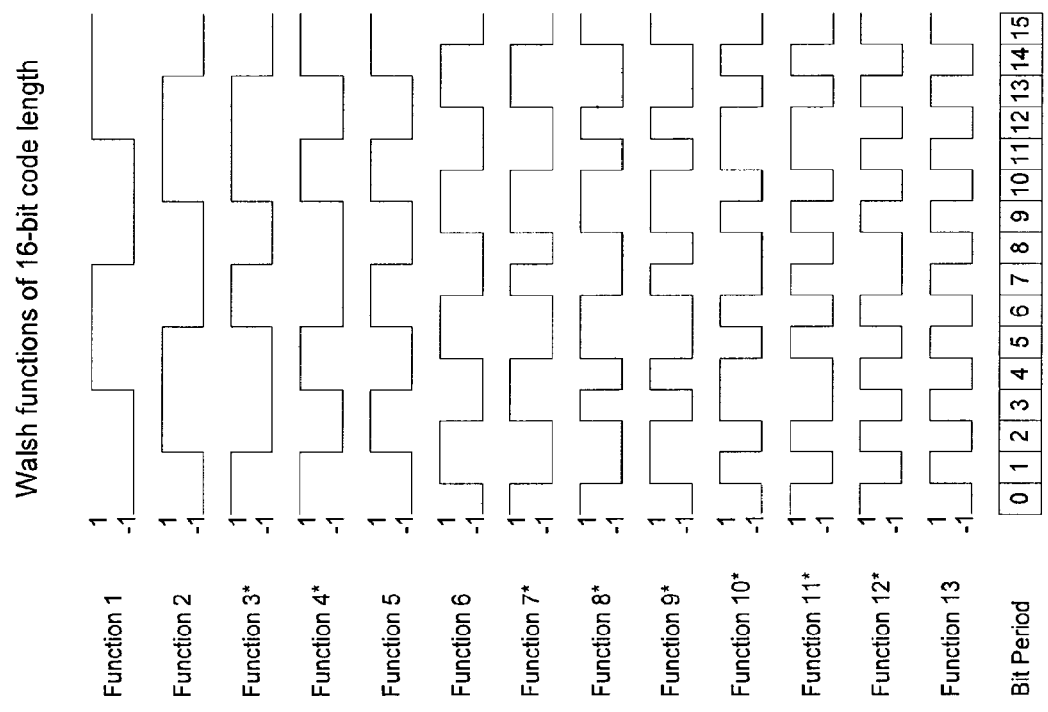
FIG. 3 is a diagram which illustrates the wave forms associated with a family of orthogonal functions such as may be used to drive the emitters of the system of FIG. 2.

FIG. 3 shows an example family of orthogonal functions with a code length of 16 samples. The cross correlation of any of these functions with any other function in the family is zero over the code length.

Function numbers 3, 4, 7, 8, 9, 10, 11 and 12 have been marked with an asterisk to indicate that these are preferable to the other family members because they are non-periodic. (Even so, functions 4 and 12 are still not ideal, as they have only one phase change and are therefore substantially periodic.)

In an additional aspect of the invention, the emitter on and off periods are varied in a complex manner. This permits the use of periodic modulation functions. The sampling of the detectors must be varied similarly so that the sample values presented to the correlation processing will be essentially unaffected by the timing variations. The timing variations can be derived from a complex function such as a pseudorandom sequence and the variations are applied globally so that all emitters change state at the same time and all detectors are sampled at approximately the same time (the use of a multiplexed analogue-to-digital converter means that they cannot be sampled truly simultaneously)

Figure 4:
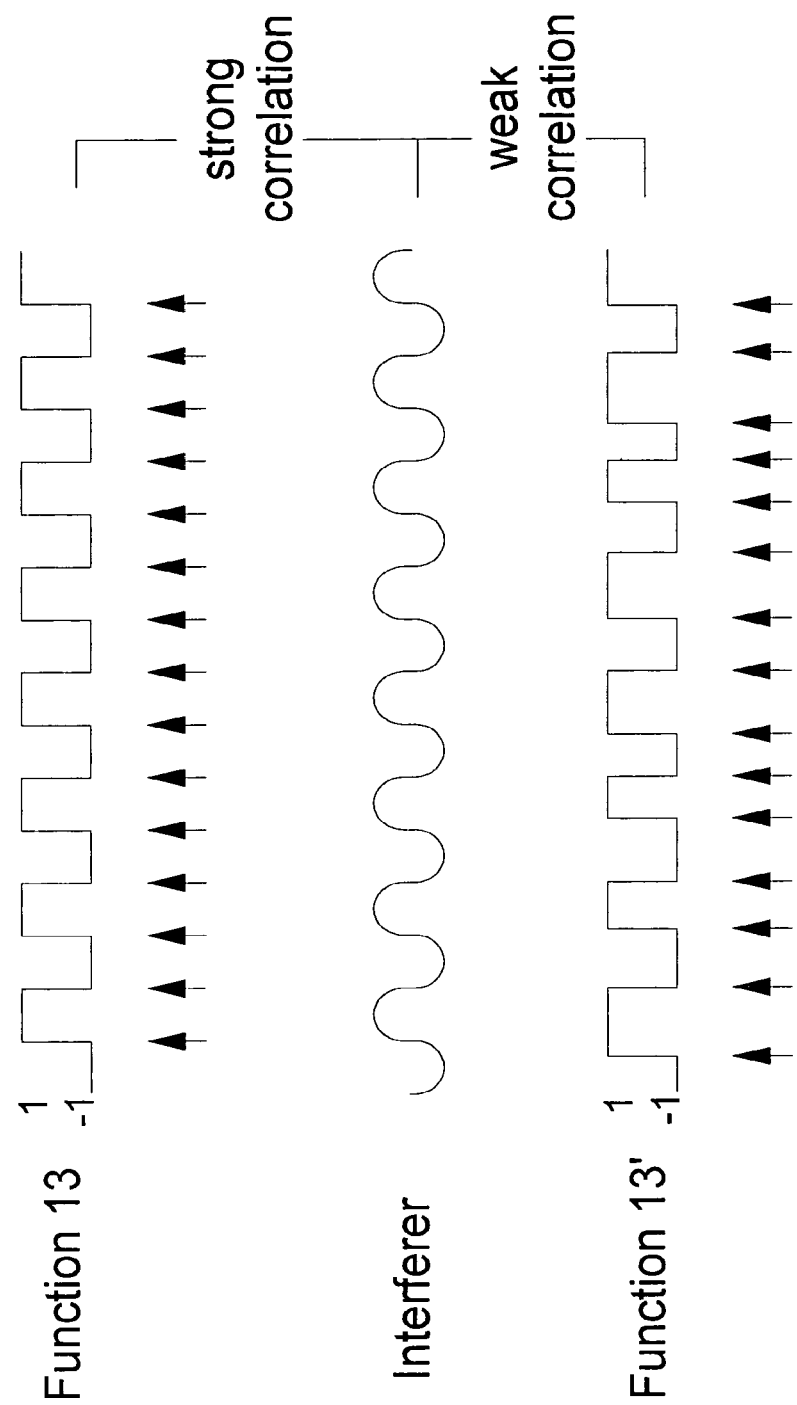
FIG. 4 is a diagram which illustrates strong and weak correlations between detector outputs and an interference source.

An external interference signal is likely to be modulated in a periodic manner and FIG. 4 shows that it is possible that it will correlate with a periodic emitter modulation function of similar frequency and phase. Function 13 in FIG. 4 is the modulation function 13 from the family of functions shown in FIG. 3. Function 13 of the example family is periodic and the transition between samples is marked with an arrow. It will be evident from the diagram that the external periodic interference signal shown is of similar frequency and phase to function 13 and would correlate strongly with function 13.

In accordance with this additional aspect of the present invention, function 13' in FIG. 4 has the same sequence of values as function 13, but the timing between the application of the function values to the associated emitter is varied and inconsistent. The transition between samples is again marked with an arrow. The detector sampling is varied in the same way so the correlation with the emitter modulation functions will be unchanged while the correlation with external periodic interference signals, which are similar in frequency to the nominal frequency of the modulating function, will be significantly reduced.

This timing variation can be applied even if only non-periodic emitter modulation functions are being used, so that the spectral components of the emitter modulation function are spread in frequency around the harmonics of the nominal modulation frequency. This will increase the rejection of typical interference signals, particularly when short code lengths are used.

In another aspect of the invention, members of a family of orthogonal functions may be chosen such that the number of emitters active at any stage during the length of the codes is limited to a maximum number. Without applying this criterion, many combinations of orthogonal functions will result in at least one step in the code length where all or all but one of the emitters are active.

If the code length is large, the number of available orthogonal functions may be large—tens of thousands for a 32-bit code length—and iterative methods can be used to select functions with the minimum number of simultaneous '1' or '0' values (whichever value corresponds to an emitter being activated).

FIG. 5 lists a set of values (in decimal and binary) for modulating 16 emitters with every bit in the binary representation word assigned to an emitter and with modulating functions of 32 bits in length. A given bit position in each of the 32 words represents the values of one orthogonal function. The set of values listed is suitable for driving emitters where an emitter is activated by a '1' value in the corresponding bit of each 16-bit word. None of the functions listed are periodic.

Thus, for each emitter, the sequence of values used to drive the emitter through a series of 32 "on" or "off" states is found by reading down the columns. Each row is a 16 bit word used to drive the 16 different emitters to the on or off state represented by a different position. So, for example, the first word (decimal 19418=binary 0100101111011010) is written to the register at the start of the first sample interval and determines that each of the first, third, fourth, sixth, eleventh, fourteenth and sixteenth emitters is driven to an "off" state, while the remaining emitters are driven to the "on" state during this first sample interval. The emitter states for the second sample interval are determined by the second row (decimal 40557=binary 1001111001101101), switching the first emitter on, the second emitter off, leaving the third emitter on, and so on.

The functions used to generate the list shown in FIG. 5 have been iteratively selected to minimise the number of emitters active at any time. In the case of the functions listed, there is no word which would activate more than 11 emitters at once. An advantage of this aspect of the invention is that it reduces the dynamic range of the light levels received at a detector. This can be translated into an improved signal-to-noise ratio in the signal acquired by the A/D converter used to digitize analogue detector outputs. An additional advantage of using functions selected in this way is reduced peak current demand caused by the relatively high operating current drawn by the emitters and reduced variation in current demand (power line noise) over the code length.

In some applications, it may also be advantageous to select functions where the minimum number of emitters that would be simultaneously active is large, so that the variation in light level at a detector and the variation in current consumption is kept to a minimal value. With the example functions shown in FIG. 5, there are never fewer than 3 emitters active at a time, so the range of light levels at the detectors will vary between the output of 3 emitters and the output 11 emitters, assuming none of the beams are interrupted. This may also be advantageous in other circumstances, such as where the detectors are phototransistors, a minimum illumination level biases the phototransistors into a relatively linear part of their characteristic curve.

In yet another aspect of the present invention, more than the requisite single sample of a detector output is acquired during a sample interval. At least one of the additional samples taken is acquired with the emitters inactive.

The taking of additional samples when the emitters are inactive is well known for the purposes of ambient light compensation. However, it is also advantageous to take such samples with a precise timing relationship to the modulation of the emitters to minimize the effects of rapidly modulated interference as well as ambient light. This can be accomplished by acquiring samples of the detector output before and after the emitters are active for a given step of their emitter functions.

Figure 6B:
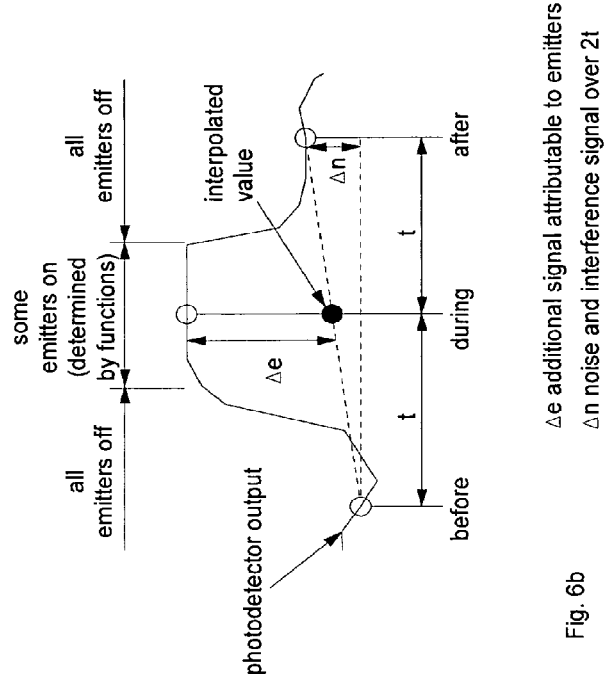
FIG. 6B is a waveform diagram illustrating how the method of FIG. 6A can be applied in practice.
Figure 6A:
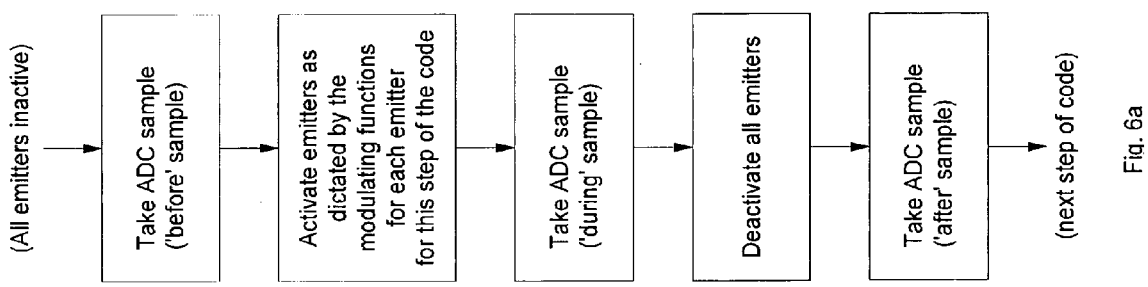
FIG. 6A is a flowchart of operation of a method for use in interpolating a noise value during operation of the system of FIG. 2.

FIG. 6a shows an example of a sampling sequence in accordance with this additional aspect of the present invention. The timescale shown covers one bit period in the length of a code. First, the emitters are forced off and a sample is taken when the detectors have settled at the resulting light level. The sample value acquired will be determined by the amount of external light which is effectively unmodulated, such as sunlight, and the amount of modulated light, such as incandescent light, which is incident upon the given detector.

A second sample is taken during the emitter activation period. It is during this time that the various functions allocated to each emitter specify whether the corresponding emitter should be activated or not for this bit period. FIG. 6b shows an example of a bit period where at least one of the emitter functions dictates that the associated emitter is to be activated. A third sample is taken after the emitter has been turned off after the emitter activation period.

If the 'before' and 'after' samples are acquired with a known timing relative to the 'during' sample (when the emitters are emitting or not as determined by the current phase of their corresponding modulation functions), an intermediate estimate of the 'during' sample with the emitters off can be interpolated. If the time between the 'before' and 'during' samples and the 'during' and 'after' samples is the same, the interpolation is simply the sum of the 'before' and 'after' sample values divided by 2. This interpolated value can be subtracted from the actual sample acquired during the emitter activation time to compensate for ambient light and interference of low frequency relative to the sample rate.

Preferably, the interval between all three samples is short relative to the modulation rate of typical interferers.

A useful value can be derived from the 'before' and 'after' samples when the difference between them is calculated. This gives an approximate measure of the noise and interference present at frequencies which are high relative to the sampling rate. This noise estimate can advantageously be used to generate alarms or inhibit the generation of scan data if the amount of noise and interference is excessive (meaning the scan data is of dubious quality).

By comparing the noise estimate with the results of the correlation process, the signal-to-noise ratio of the signal at a detector can be estimated for each emitter. This can be used to control the emitter power as described in our co-pending specification (PCT application claiming priority from Irish Patent Application S2008/0653).

When sampling rapidly and with fixed timing, the 'before' sample of one function bit period may be the 'after' sample of the previous bit period.

Figure 7:
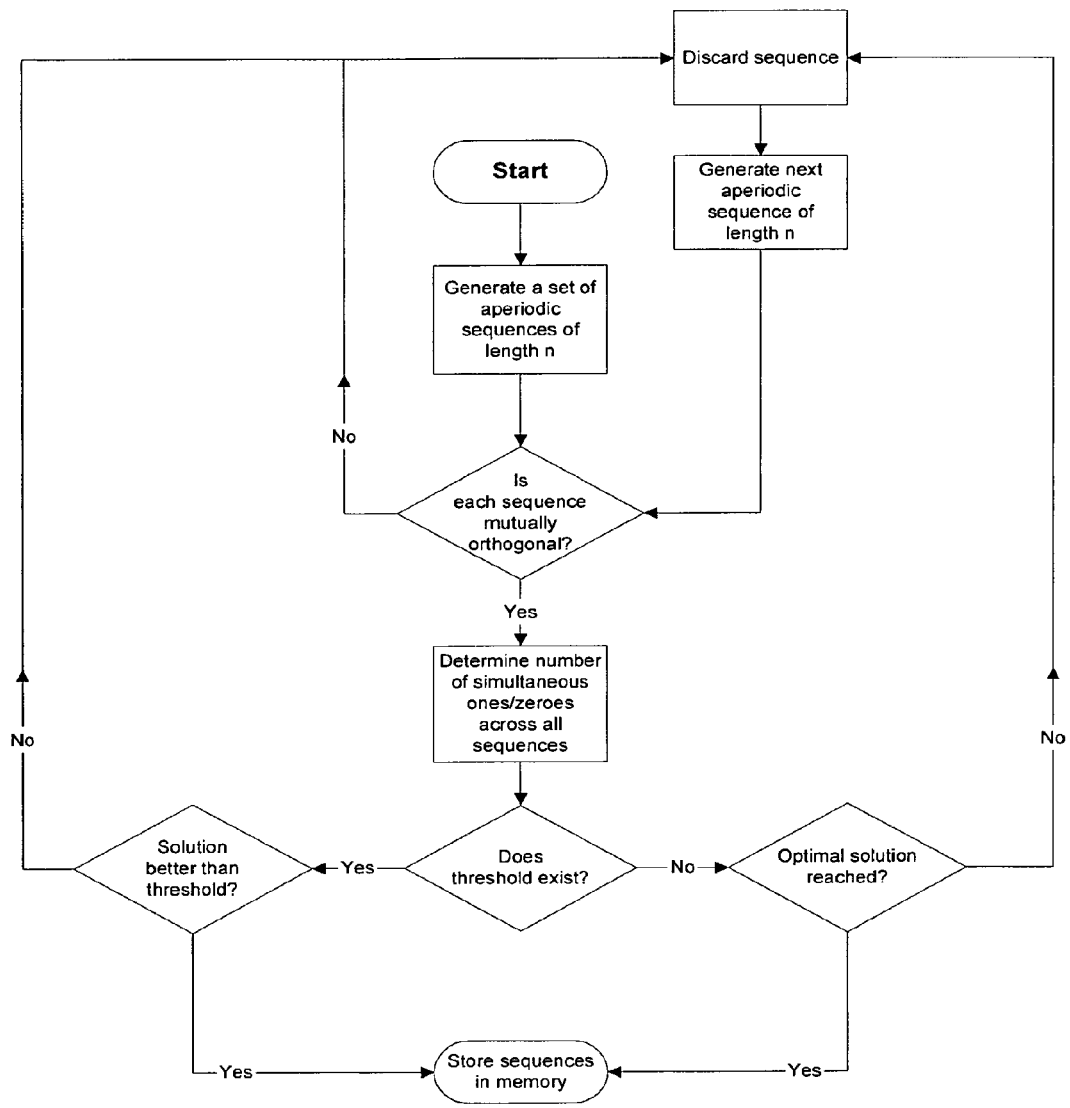
FIG. 7 is a flowchart of a method for selecting a set of modulation functions or codes.

FIG. 7 is a flowchart showing one way of generating a set of modulation functions. A set of aperiodic sequences of the required length is generated and tested for mutual orthogonality. The number of ones and/or zeroes in each position is checked across the set of sequences. If a threshold has been set (e.g. no more than 11 ones in the same position in each of 16 sequences) then a comparison is made with this threshold, and additional candidate sequences are substituted until the threshold is met. If no threshold has been set, the process continues by discarding and replacing sequences until an optimal solution is reached.

Alternatively, one could generate families of mutually orthogonal sequences and, within each such family, select the required number of functions (e.g. 16 functions to drive a group of 16 emitters) based on the optimal solution in terms of highest minimum number of simultaneous "off" states and/or lowest maximum number of simultaneous "on" states. This could be repeated for several such families of mutually orthogonal functions up to and including exhaustively testing all such sequences of length N to find the optimal solution.

The invention is not limited to the embodiment described herein but can be amended or modified without departing from the scope of the present invention.

What is claimed is:

1. An optical touch detection system comprising:
a touch sensitive area within which touch events are to be detected;
a plurality of emitters and a plurality detectors arranged around a periphery of the touch sensitive area, each emitter producing a plurality of optical beams received by a plurality of the detectors, wherein touch events disturb the optical beams; and
an optical control system coupled to the emitters and detectors, the optical control system configured to:
control activation of a plurality of the emitters and detectors simultaneously according to a modulation scheme comprising a plurality of different functions, each function alternating an associated one of the emitters between an activated state and a deactivated at a pattern of times varying from that of each other function in the modulation scheme,
wherein in the activated state the associated emitter is emitting optical beams and in the deactivated state the associated emitter is not emitting optical beams such that the deactivated state consumes less power than the activated state; and
correlate output from the detectors regarding which optical beams have been disturbed by a touch event with the different functions to determine a location within the touch sensitive area where the touch event occurred.

2. The optical touch detection system of claim 1, wherein the functions are orthogonal functions such that each function is orthogonal with respect to every other function with respect to activated state and deactivated state time periods.

3. The optical touch detection system of claim 1, wherein the functions are further differentiated using amplitude modulation.

4. The optical touch detection system of claim 1, wherein at least one of the detectors is positioned to receive optical energy from more than one of the optical emitters.

5. The optical touch detection system of claim 1, wherein disturbing an optical beam comprises changing an amount of energy received at least one detector relative to an amount of energy transmitted from at least one emitter.

6. The optical touch detection system of claim 1, wherein each of the functions keeps at least a minimum number of emitters simultaneously in the activated state to reduce a current consumption in the optical touch detection system.

7. The optical touch detection system of claim 1, wherein each of the functions keeps less than a maximum number of emitters simultaneously in the activated state to reduce a dynamic range of light levels received at a detector.

8. The optical touch detection system of claim 1, wherein the functions are non-periodic functions over a time period during which they are orthogonal with respect to every other function.

9. The optical touch detection system of claim 1, wherein the optical control system comprises a memory configured to store the functions, and a drive circuitry configured to access the functions and to control the operation of the emitters and detectors based on the functions.

10. The optical touch detection system of claim 1, wherein the optical control system comprises a variable timing mechanism configured to vary at least one of the functions with a non-periodic frequency of activation states and deactivation states.

11. The optical touch detection system of claim 10, wherein the variable timing mechanism is further configured to vary sampling of detector output according to the non-periodic frequency.

12. The optical touch detection system of claim 1 comprising a noise detection mechanism configured to sample detector output before and after one of the emitter activation states to determine a noise level before and after the activation state.

13. The optical touch detection system of claim 12 wherein the noise detection mechanism is further configured to interpolate a noise level during one of the emitter activation states based on the noise level before and after the activation state.

14. The optical touch detection system of claim 13 wherein the noise detection mechanism is further configured determine energy incident on the detectors based on detector output sampled during one of the emitter activation states and based on the noise level during the emitter activation state.

15. The optical touch detection system of claim 13 wherein the noise level during the emitter activation state is used to determine an emitter power level.

16. The optical touch detection system of claim 1, wherein the optical control system is further configured to:
   correlate the functions with output from the detectors regarding which optical beams have been disturbed by a plurality of touch events to determine a location within the touch sensitive area where each of the touch events occurred.

17. A method for determining locations of touch events within a touch sensitive area, the touch sensitive area having a plurality of emitters and a plurality of detectors arranged around its periphery, each emitters producing a plurality of optical beams received by a plurality of the detectors, wherein touch events disturb the optical beams, the method comprising:
   activating a plurality of the emitters and detectors simultaneously according to a modulation scheme comprising a plurality of different functions, each function alternating an associated one of the emitters between an activated state and a deactivated at a pattern of times varying from that of each other function in the modulation scheme,
   wherein in the activated state the associated emitter is emitting optical beams and in the deactivated state the associated emitter is not emitting optical beams such that the deactivated state consumes less power than the activated state; and
   determining a location within the touch sensitive area where a touch event occurred based on which beams have been disturbed by the touch event and based on the different functions.

18. The method of claim 17, wherein at least one of the detectors is positioned to receive optical energy from more than one of the optical emitters.

19. The method of claim 17, wherein disturbing an optical beam comprises changing an amount of energy received at least one detector relative to an amount of energy transmitted from at least one emitter.

20. The method of claim 17, further comprising:
   determining a plurality of locations within the touch sensitive area where a plurality of touch events occurred based on which beams have been disturbed by the touch events and based on the functions.

* * * * *